Aug. 3, 1954
W. W. PAGET
2,685,179
METHOD AND APPARATUS FOR TREATING GASEOUS MIXTURES
Filed June 5, 1951
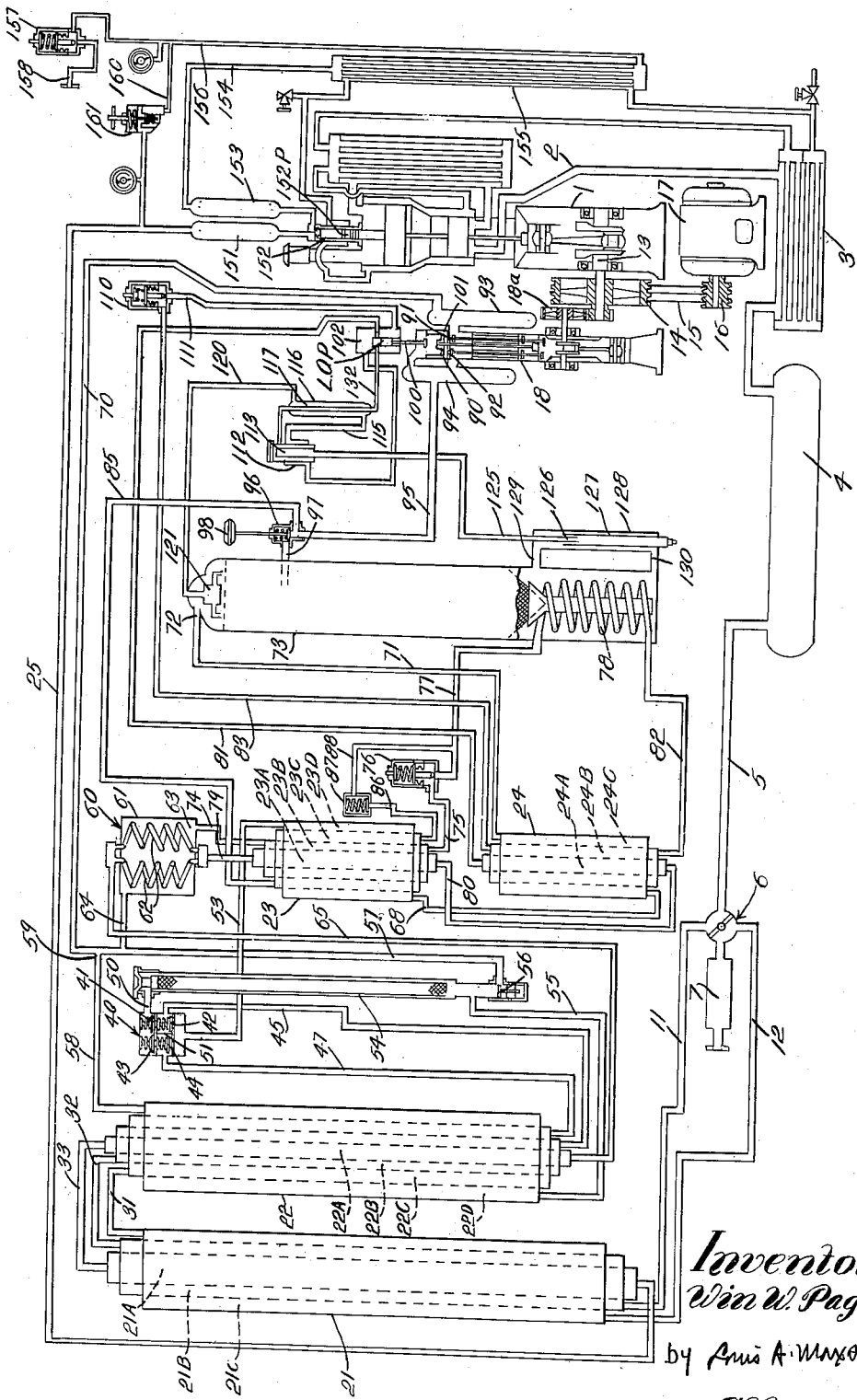
Inventor:
Win W. Paget.
by Anis A. Maxon,
Attorney.

Patented Aug. 3, 1954

2,685,179

UNITED STATES PATENT OFFICE 2,685,179

METHOD AND APPARATUS FOR TREATING GASEOUS MIXTURES

Win W. Paget, Mountain Brook, Ala., assignor to Joy Manufacturing Company, Pittsburgh, Pa., a corporation of Pennsylvania Application June 5, 1951, Serial No. 230,042

12 Claims. (Cl. 62—122)

This invention relates to improvements in methods of and means for treating gases. It will be described particularly in its application to the production of substantially pure oxygen from air, but it will be understood that its use is not so limited.

It is desirable, for many uses, that oxygen be produced of rather high purity, as, for example, 99.5%, and it is often desirable that it be made available at substantial pressure, and it is desirable that the "generator" be made as completely safe and as nearly free from need for close supervision as possible.

In the application of Samuel C. Collins, Serial No. 122,077, filed October 18, 1949, for Methods of and Means for Treating Gases, and now abandoned, and in application Serial No. 383,541, which is a division of Serial No. 122,077 and which was filed on October 1, 1953, also for Methods of and Means for Treating Gases, there is disclosed an oxygen generator in which the entering air stream, after the removal from it, in a reversing heat exchanger, of water vapor and carbon dioxide, is divided, and a major portion is passed through an expansion engine on the way to a column, while a minor portion—on the order of 12% of the total—is passed through a boiler-condenser in counterflow heat exchange relation with the leaving liquid oxygen product, which has had, by a liquid oxygen pump, its pressure increased, while in the liquid state, materially above the pressure at which it is withdrawn from the column, and the pressures of the air and of the liquid oxygen are so related that during normal operation substantially the entire heat of vaporization of the liquid oxygen is subtracted from the air and there is liquefaction of an equivalent quantity of the air, which is then, after a suitable pressure reduction, passed into the base of the column. In the Collins application, the entering air stream is described, for purposes of illustration, as at a pressure of on the order of 158 p. s. i. g. at its point of entry into the boiler-condenser and at a temperature on the order of 115° K., and the liquid oxygen which is vaporized in the boiler-condenser by the air which it liquefies is described as entering the boiler-condenser at approximately 50 p. s. i. g. and at a temperature of on the order of 107° K. If there is a substantial increase in the pressure of the liquid oxygen while the pressure and temperature of the entering air stream remain the same, two things will occur: (a) there will be less liquid air produced in the boiler-condenser, and (b) there will be a loss of refrigeration as a portion of the leaving oxygen product passes out of the boiler-condenser unvaporized and enters the reversing heat exchanger in the liquid state.

A column can produce from a given stream of air a certain quantity of oxygen of a particular purity, and by properly controlling the amount of product a control of purity is possible. Accordingly, by supplying a constant amount of air to a generator and removing a constant quantity of oxygen product, in each case, of course, in unit time, a close control of quality of the product can be effected.

Primary improvements of this application over the apparatus of the Collins application consist of providing a constant speed (i. e. synchronized with the speed of the raw air supplying compressor and liquid oxygen pump) booster for the gaseous product for increasing its pressure to some desired value, imposing on the booster discharge a constant back pressure, and providing for a bleed-back from the booster discharge to its suction line of oxygen product in the event that there be a fall in the pressure in the suction line of such an amount that excessive heating might result from too many "compressions" of the gaseous product in the booster.

There will, of course, be provided sufficient refrigeration at all times to insure that enough liquid will overflow from the column to the liquid oxygen pump to give a product at least of normal quantity—the quantity which will under normal operating conditions give the desired purity of product. Then, under normal—i. e. those designed to be maintained—operating conditions there will be maintained a normal pressure at the booster intake. That pressure will be less than the pressure at which the oxygen product emerges from the boiler-condenser in which it is designed to be vaporized by entering air, by the amount of the pressure drop in the reversing heat exchanger, and the pressure in the boiler-condenser course traversed by the oxygen product will be that which will just permit liquid oxygen to evaporate at the thermal expense of entering compressed air, at the regulated pressure of the intake to the expansion engine, condensing in the other course of the boiler-condenser.

With such a plant, if there be temporarily too much refrigeration, more liquid, of slightly lower purity, will pass from the column to the liquid oxygen pump and ultimately, after vaporization, to the booster. Since the speed of the booster is constant, the increase in quantity of oxygen product will result in an increase in the intake pressure at the booster, and this will reflect back to the oxygen course of the boiler-condenser, and because of the higher pressure there a portion of the liquid oxygen will not evaporate in the boiler-condenser, but will pass over in liquid state into the reversing heat exchanger where the refrigeration effect is partly lost. Thus less liquid air will be produced in the boiler-condenser, and less will arrive at the column, and this will mean a reduction in the quantity of liquid oxygen produced and overflowing to the pump, and the condition of excessive refrigeration will be corrected. Thus the changes in amount of product and decrease in purity will be held to small values.

If the refrigeration be temporarily inadequate, there will be a smaller quantity of liquid—of higher purity—produced in the column, and the suction pressure of the booster will fall below normal. Bleeding back of oxygen product from the booster discharge line to the booster suction will prevent too high a compression ratio, and if the condition of inadequate refrigeration be temporary and not of excessive duration, there will be no breakdown in operation.

Desirably the refrigeration would be just the amount required for perfect operating conditions, but it will be preferable to provide a slight excess, rather than to have an inadequate amount, since in practical operation fortuitous variations in operating conditions are unavoidable. And the booster will be so designed that it will just take the available amount of oxygen product of desired purity, at the pressure, less by the amount of the pressure drop through the reversing exchangers, etc., at which complete vaporization of the oxygen product takes place in the boiler-condenser. In other words, if the amount of oxygen product increases, with resultant loss of purity, there will at once be an increase in the pressure in the booster intake, and this will reflect back to the oxygen course in the boiler-condenser, and result in an incomplete vaporization of the oxygen product in the boiler-condenser, with the results above noted.

From the foregoing discussion, which will provide a preliminary understanding of the invention which will be advantageous in entering upon a perusal of the detailed description of an illustrative embodiment of the invention from its apparatus aspects, it will be understood that the primary objects of the invention are to provide an improved apparatus for the rectification of gaseous mixtures, and an improved method therefor, and, incidentally thereto, to provide improvements in and new combinations of apparatus for the purposes mentioned.

It will be evident that the invention can be practiced from both of its aspects alike with single and double column apparatus, and a "single column" embodiment will be described in some detail, and a "double column" one will not need to be shown and described as it will be evident that, for example, a double column generator of the type disclosed in the Collins application above mentioned might replace the single column one to be shown and described herein.

In the accompanying drawing, in which, therefore, only a single column generator system is shown for the purpose of illustrating the invention from its apparatus aspect and disclosing the practice of its method aspect, the figure is a diagrammatic view of an oxygen generating and supplying apparatus utilizing a single column.

Referring now to the drawing, it may be noted that raw air, at a temperature of approximately 300° K., and a pressure of on the order of 160 p. s. i. (all pressures are gauge unless otherwise indicated), may be delivered from a suitable two stage air compressor 1, through a conduit 2, an after-cooler 3, a receiver 4, and a delivery conduit 5, to a valve mechanism generally designated 6; and the effluent (principally nitrogen) leaving the apparatus may be discharged to the atmosphere through a muffler 7. The valve mechanism 6 is of the mechanically actuated type and is periodically reversed—every three minutes or so—in its position by power, and in the position shown in the figure, connects the delivery conduit 5 for entering air with a conduit 11 and effluent (nitrogen) discharge with a conduit 12. A reversing valve mechanism, suitable for the performance of the function of the valve mechanism 6, is illustrated in the application of Walter Mizen, Serial No. 190,745, filed October 18, 1950, and now Patent No. 2,638,926, granted May 19, 1953, but it will be understood that any other suitable valve mechanism may be utilized, as, for example, the one shown in the Samuel C. Collins application, Serial No. 661,253, filed April 11, 1946; and still another suitable one is shown in my copending application, Serial No. 35,092, filed June 25, 1948, now Patent No. 2,638,923, granted May 19, 1953.

The compressor 1 has a crank shaft 13, having a fly wheel 14 driven as by V-belts 15 by the drive pulley 16 of a suitable motor 17, and the valve mechanism 6 may be driven from this same power source through suitable reducing gearing not shown. Reversals of the valve mechanism 6 are, as above noted, adapted to be effected at relatively short intervals—on the order of three minutes. The conduits 11 and 12 are connected with different courses in the first of two heat exchangers 21 and 22. These heat exchangers might be formed in one unit were it not desired to maintain the overall height of the generator at a minimum. As will shortly be apparent, entering air passes through the exchangers 21 and 22 in the order stated, while leaving nitrogen effluent passes through them in the order 22 and 21. Heat exchanger 21 is of the three-fluid type and includes courses 21A, 21B and 21C. Exchanger 22 has a fourth course 22D later more fully mentioned, but also includes courses 22A, 22B and 22C, corresponding generally to the courses 21A, 21B and 21C, respectively connected with the latter. The entering air and leaving nitrogen flow alternately in the courses 21B, 22B, and 21C and 22C, the entering air flowing inwardly through one or the other of these pairs of courses, and the nitrogen effluent flowing outwardly through the one of such pairs of courses not at any given moment serving for the in-flow of air. Through the course 22A of the exchanger 22, and the course 21A of the exchanger 21, the leaving oxygen product is discharged. The fourth course 22D of exchanger 22 is used for the recirculation through exchanger 22 of a portion of the entering air, the better to effect the depositing out of impurities (moisture and $CO_2$) from the entering air stream. The exchangers 21 and 22 are shown for simplicity with coaxial courses, but it will be understood that in practice any suitable constructions providing for the necessary efficiency of heat exchange will be utilized.

To recapitulate, the conduit 11 communicates with the course 21B of exchanger 21, and the conduit 12 with course 21C of exchanger 21. The leaving oxygen product passes outwardly through course 21A of exchanger 21, and to a conduit 25, of which more will be said at a later time. Course 21C of exchanger 21 is connected by a conduit 31 with course 22C of exchanger 22. Course 21B of exchanger 21 is connected by a conduit 32 with course 22B of exchanger 22. A conduit 33 connects course 21A of exchanger 21 with course 22A of exchanger 22. It will be appreciated that entering raw air will flow alternately either through course 21C, conduit 31 and course 22C, or course 21B, conduit 32 and course 22B, while concurrently nitrogen effluent will flow outwardly through the ones of the courses and passages last mentioned not carrying the entering air.

A suitable automatic reversing valve mechanism, generally designated 40, includes four automatic check valves, 41, 42, 43 and 44, and a suitable valve mechanism is illustrated in the Samuel C. Collins application, Serial No. 661,253. The lower end of course 22B has connected with it a conduit 45 which leads to a point in the valve mechanism 40 between the check valves 41 and 42. A conduit 47 connects course 22C with the valve mechanism 40 at a point between the check valves 43 and 44. When the check valves 41 and 43 are open—they are not open together—they permit flow to a conduit 50. The check valves 42 and 44 are separated from each other by a septum 51, and they open to permit flow from a conduit 53 respectively to the conduits 45 and 47. The conduit 50 leads to an air cleaner or filter 54, the further end of which, in terms of of direction of flow of entering air, is connected by a conduit 55 with the course 22D, the fourth course in exchanger 22. A suitable adjustable restrictor device 56 is arranged at the lower end of the air cleaner or filter 54, at the entrance to a conduit 57, and creates a pressure difference, perhaps on the order of two pounds, to cause a desired quantity of air to be diverted through course 22D, the upper end of which is connected by a conduit 58 with the conduit 57 at point 59. An evaporator-condenser 60, has a suitably insulated casing 61, and includes an oxygen conducting course arrangement 62 and an air conducting course 63 in close heat exchange relation with each other. The course 63 is connected by a conduit 64 with the conduit 57. The oxygen course 62 is connected by a conduit 65 with the bottom of course 22A of exchanger 22. Beyond point 59, a conduit 70 leads the air passing to it through the conduits 57 and 58 to an expansion engine 18, connected as by gearing 18a, to the crank shaft 13.

When the air entering the system is passing through course 22B it flows past the check valve 41. When course 22B is serving for outflow of nitrogen effluent, the flow is from the conduit 53, past the check valve 42 and through conduit 45 to course 22B. When course 22C is serving for the inflow of air, the entering air flows past the check valve 43 in transit between the conduit 47 and the conduit 50. When course 22C is being used to conduct leaving nitrogen effluent, the latter flows from the conduit 53, past the check valve 44, and through the conduit 47 to course 22C. As the entering air is at a much higher pressure than the leaving nitrogen, the check valves 42 and 44 cannot be opened by the nitrogen pressure in conduit 53 while entering air is acting on their opposite sides.

A heat exchanger 23 has four courses numbered respectively 23A, 23B, 23C and 23D. Another heat exchanger 24 has three courses, 24A, 24B and 24C. The conduit 53 is connected with the course 23D, as here shown with the top of the latter. The bottom of the course 23D is connected by a conduit 68 with the bottom of course 24C, and the top of course 24C is connected by a conduit 71 with the nitrogen effluent connection 72 of a single column 73.

The compressed air course 63 of evaporator-condenser 60 communicates with the top of course 23B of exchanger 23 via a conduit 74. The bottom of course 23B is connected by a conduit 75 with a pressure reducing valve device 76, which in the particular apparatus shown is adjusted to effect a pressure drop between its opposite sides of on the order of 88 p. s. i., when the compressor delivery pressure is 160 p. s. i. As will later appear, this is substantially the same reduction in pressure as occurs in the expansion engine 18 during normal oxygen production. The down stream side of the valve device 76 is connected with a conduit 77, which leads to a boiler-condenser unit 78 in the lower end of the column 73. The course 23A of exchanger 23 is, as shown, connected at its top by a conduit 79 with the oxygen course 62 of the evaporator-condenser 60, and the bottom of the course 23A is connected by conduit 80 with the bottom of the course 24A of exchanger 24. From the top of course 24A, a conduit 81 leads to a liquid oxygen pump LOP, later described. The unit 78 is connected, at its other end from the conduit 77, by a conduit 82, with the course 24B of exchanger 24, while the top of course 24B is connected with a conduit 83 whose other connection is later described. The remaining course 23C, of exchanger 23, is connected at its top with an expanded air conduit 85, and its lower end is connected by a conduit 86 containing a check valve 87 with a conduit 88, which leads to the conduit 77. The check valve 87 opens from the conduit 86 towards the conduit 88, when the pressure in the conduit 86 is sufficient to open the check valve 87 against the pressure in the conduit 77.

The expansion engine 18 includes a cylinder 90 having admission and discharge valves respectively numbered 91 and 92. An engine of appropriate construction is illustrated in my application, Serial No. 31,017, filed June 4, 1948, now Patent No. 2,678,028, granted May 11, 1954, but it will be understood that other expansion engines may be used. Entering air flows past the admission valve 91, when the latter is open, from the conduit 70 and an "in" surge tank 93, while the discharge valve 92, when open, effects the delivery of expanded air to a "discharge" surge tank 94, which is connected by a conduit 95 with an appropriately controlled valve mechanism 96, which when open permits the connection of the conduit 95 with a conduit 97, opening into the column 73 somewhat below the top of the latter. When the valve 96 is closed, as it is during normal operation, the expanded air flows from the conduit 95 to the conduit 85 previously described. The valve 96 may be provided with any suitable control and a pressure fluid actuated control is diagrammatically indicated at 98.

The liquid oxygen pump LOP, which is of a pumping capacity such as to be able to handle, with some margin, all of the oxygen product produced, is shown as mounted on top of the expansion engine cylinder and may be desirably actuated through the engagement of its piston operating rod 100 by the piston 101 of the expansion engine. The liquid oxygen pump may be suitably jacketed with colder fluid if desired, as in the applications of Samuel C. Collins, Serial Nos. 122,077 and 383,541, and in the figure shown a jacket chamber is indicated at 102.

The conduit 83 leads to a valve device 110, which is desirably adjusted to effect a reduction on the order of 60 p. s. i., in the pressure of the fluid (liquid air) which flows through it; and the down stream side of the valve device is connected by conduit 111, serially, with the jacket 102 of the liquid oxygen pump and with the jacket 112 of a strainer 113 for the oxygen product. The top of the jacket 112 is connected by conduit 115, with the jacket 116 of a super-cooler 117 for liquid oxygen passing to the liquid oxygen pump LOP. It will be noted that the conduit 81 is connected with the discharge of the liquid oxygen pump LOP. Following the completion of its jacketing function, the liquid air passes from the jacket 116, through a conduit 120 to a device 121 through which liquid air may be admitted to the top of the column 73.

The column 73 may be of any suitable construction and is illustrated as of a conventional packed type. The liquid oxygen product passes to the strainer 113, through a conduit 125 whose lower end extends, at 126, into an open-topped chamber 127 in the casing 128, whose upper and lower ends are connected as at 129 and 130 with the space outside the unit 78 in the bottom of the column 73. It will be evident that liquid oxygen will flow into the chamber 127 only when the liquid oxygen level in the column is at least slightly above the top of chamber 127, and that the liquid oxygen pump can draw liquid oxygen only when the level of the liquid oxygen stands in the chamber 127 high enough for the mouth of the conduit 125 to be submerged. It will, therefore, be evident that the liquid oxygen pump cannot affect the level of the liquid oxygen in the bottom of the column to the extent of drawing down this level below the top of the chamber 127. From the strainer 113 a conduit 132 conducts the liquid oxygen to the intake of the liquid oxygen pump LOP.

During normal operation, about 12% of the total entering air stream is passed through evaporator-condenser 60 and is condensed by heat exchange with the leaving liquid oxygen stream. The liquid oxygen pump raises the pressure of the liquid oxygen to approximately 50 p. s. i., and the pressure of the entering air stream in the course 63 of evaporator-condenser 60 is about 158 p. s. i., and it will be apparent that under these pressure conditions, the approximately 12% of entering air will be completely liquefied through giving up heat in the process of vaporizing the liquid oxygen in the course 62. It will be understood that if the pressure of the liquid oxygen rises above 50 p. s. i. materially, the liquid oxygen cannot be wholly vaporized in evaporator-condenser 60, and some of it will pass over in liquid form into exchanger 22 where there will be a loss of refrigerating effect, and accordingly a smaller quantity of liquid air will pass into the column.

The conduit 25, into which the gaseous oxygen product at substantially 50 p. s. i. (its pressure is somewhat reduced by the resistance to flow in exchangers 21 and 22) is delivered, is connected to the intake surge chamber 151 of a booster 152, the piston 152P of which is driven with the air compressor 1; and from the booster 152, the compressed gaseous oxygen is discharged to a discharge surge chamber 153, and then the gaseous oxygen at a higher pressure, 200 p. s. i. as shortly explained, will pass through a conduit 154 and through a heat exchanger 155, and through a conduit 156, and to a predetermined back pressure maintaining valve 157, whose function it is to maintain the back pressure on the discharge of the booster at a constant 200 p. s. i. It will be evident that other back pressures might be selected, appropriate variations in the booster then being made. All gaseous oxygen which passes the automatic back pressure valve is discharged to a conduit 158, and passes to a desired point of use or storage. It will be evident that if a constant back pressure is maintained on the booster discharge line, conditions appropriate to uniform operation of the entire generating plant will subsist. It will be understood, however, that there are fortuitous variations in the operation of a plant of this character, depending upon variations in temperature, in the atmospheric pressure of the entering air, humidity, etc. Conditions may therefore develop which will result in a temporary reduction in the amount of gaseous oxygen furnished to the intake of the booster 152, and if the booster intake pressure falls below a predetermined point, there might be an excessive number of compressions between the booster intake and discharge, and there is therefore provided a by-pass connection 160, between the lines 25 and 156. This by-pass connection, controlled by an automatic pressure responsive by-pass valve 161, is responsive to pressure in the conduit 25, and opens, when that pressure drops to a predetermined point, to allow back flow of gaseous oxygen from the conduit 156 to the intake to the booster 152, to preclude the compressing of gaseous oxygen through too great a range of compression, with resultant potential danger due to excessive heat of compression.

It will now be apparent that two major additions have been made to the apparatus of the Samuel C. Collins application, Serial No. 122,077, above mentioned, and of Serial No. 383,541, above mentioned: (1) the provision of a booster synchronized with the expansion engine, the liquid oxygen pump and the compressor supplying air to the apparatus and with a constant back pressure maintained upon its discharge, and (2) the provision of an automatically controlled by-pass for permitting back flow of gaseous oxygen from the booster discharge to the booster intake, when booster intake pressure falls below a desired minimum. The latter improvement needs no further explanation, though its value is indubitable. The first may, however, warrant further brief attention in order that it may be surely understood. It has been noted that the entering air stream reaches evaporator-condenser 60 at a pressure on the order of 158 p. s. i. g., and its temperature is on the order of 115° K., while the liquid oxygen, which is to be vaporized in the boiler-condenser 60 by heat derived from the air which it liquefies in the course of its own vaporization, is intended normally to enter the boiler-condenser at about 50 p. s. i. g., and at a temperature on the order of 107° K. If there be a substantial increase in the pressure of the liquid oxygen stream entering evaporator-condenser 60, two things occur: (1) less liquid air will be produced in the boiler-condenser, and (2) there will be a loss of refrigeration as a portion of the leaving oxygen product passes out of the evaporator-condenser unvaporized and enters the reversing heat exchanger in a liquid state. Accordingly, should a temporary condition of too much refrigeration, with attendant production of more liquid of slightly lower purity, occur, the increased suction pressure of the constant speed booster will reflect back to the oxygen course of the boiler-condenser 60, and because of the above enumerated results of increased oxygen pressure, there will occur an automatic reduction in the quantity of liquid air produced, and the condition of excess refrigeration will be brought to an end and there will be an improvement in product purity.

With the apparatus described, the compressor 10 1, driven at a constant speed, delivers a substantially constant mass per unit of time of air to the system. The liquid oxygen pump, LOP, withdraws all of the liquid oxygen produced in the column (its capacity is such that it actually normally draws some vapor from the column) and delivers it to the heat exchangers 24, 23, the evaporator-condenser 61, and exchangers 22 and 21, and the oxygen product, then in vapor state, is delivered by the conduit 25 to the intake of the booster 152. The latter is so constructed as to handle the full normal amount of gaseous oxygen product, but, being synchronized with the compressor and the liquid oxygen pump, it will have its intake pressure rise if the quantity of gas it has to handle increases, as will occur if the quantity of oxygen product increases. This increased pressure will reflect back through the conduit 25, and heat exchangers 21 and 22, to the evaporator-condenser 61 and instead of the liquid oxygen being under a pressure of, as per illustration, 50 p. s. i., there will be an increase in pressure thereof, with a resultant reduction in its own condensation and in the quantity of liquid air delivered to the column. As will be obvious from the explanations given above, this promptly results in a reduction in the amount of oxygen product and an improvement in purity. In the foregoing paragraph the terms liquid oxygen and oxygen product will be understood to be applicable despite the changes in purity which attend the variations in the quantity thereof produced per unit of time under the varying conditions which may be encountered and overcome by this invention.

If the present invention were incorporated in an apparatus incorporating a double column unit, the changes in connections will be obvious from the present description and from the disclosure of the Collins application Serial No. 122,077 and that of application Serial No. 383,541.

It will be evident that with appropriate modifications the present method and apparatus can be adapted to the separation of other gaseous mixtures.

While there is in this application specifically described one form which the invention may assume in practice and one mode of its performance from its method aspect, it will be understood that this form and mode have been particularly disclosed for purposes of illustration, and that the invention may be modified and embodied in various other forms and practiced in other modes without departing from its spirit or the scope of the appended claims.

What is claimed is:

1. In an oxygen-generating apparatus for supplying gaseous oxygen of a high degree of purity and at a relatively uniform rate, in combination, a plurality of heat exchangers traversed by entering air, a column for receiving air from said exchangers and delivering liquid oxygen, a liquid oxygen pump taking liquid oxygen from the column and raising the pressure thereof above column pressure, means for connecting the liquid oxygen pump discharge with said heat exchangers for utilizing in the latter the refrigeration in the oxygen, whereby the oxygen leaves said exchangers in a gaseous state, but at at least substantially the same pressure as the discharge pressure of said liquid oxygen pump, booster means for raising the pressure of the gaseous oxygen to a materially higher value, and a valve device for regulating the pressure of the oxygen discharged by said booster means maintaining the same substantially constant.

2. In an oxygen-generating apparatus for supplying gaseous oxygen of a high degree of purity and at a relatively uniform rate, in combination, a plurality of heat exchangers traversed by entering air, a column for receiving air from said exchangers and delivering liquid oxygen, a liquid oxygen pump taking liquid oxygen from the column and raising the pressure above column pressure, means for connecting the liquid oxygen pump discharge with said heat exchangers for utilizing in the latter the refrigeration in the oxygen, whereby the oxygen leaves said exchangers in a gaseous state, but at at least substantially the same pressure as the discharge pressure of said liquid oxygen pump, a booster pump for raising the pressure of the gaseous oxygen to a materially higher value, means for regulating the maximum pressure of the oxygen discharged by said booster pump to maintain the same substantially constant, and a valve device governed by the pressure at the intake side of said booster means for by-passing fluid from the discharge of said booster means to the suction side of the latter.

3. In an apparatus for treating gaseous mixtures, in combination, a column, means for supplying to said column, at a predetermined rate and at a reduced temperature, a gaseous mixture, to be rectified, said supplying means including an evaporator-condenser having courses, in heat exchange relation with each other, for said gaseous mixture and a reversely flowing product, means for withdrawing said product in a liquid state from said column and raising its pressure to a point at which said product will just be completely vaporized in said evaporator-condenser in the process of liquefying the mixture passing towards the column, and means including a booster pump discharging against a predetermined back pressure for withdrawing at a constant rate predetermined at the capacity of the apparatus for the production of product of the desired purity, and raising the pressure of, the vaporized product.

4. In an apparatus for treating gaseous mixtures, in combination, a column, means for supplying to said column, at a predetermined rate and at a reduced temperature, dried and purified air, said supplying means including an evaporator-condenser having courses, in heat exchange relation with each other, for entering air and reversely flowing oxygen product, means for withdrawing said product from said column and raising its pressure to a point at which said product will just be completely vaporized in said evaporator-condenser in the process of liquefying air passing towards the column, and means for withdrawing at a constant rate predetermined at the capacity of the apparatus for the production of product of the desired purity, and raising the pressure of, the vaporized product.

5. In an apparatus for treating gaseous mixtures, in combination, a column, means for supplying to said column, at a predetermined rate and at a reduced temperature, a gaseous mixture to be rectified, said supplying means including an evaporator-condenser having courses, in heat exchange relation with each other, for said gaseous mixture and a reversely flowing product, means for withdrawing said product in a liquid state from said column and raising its pressure to a point at which said product will just be completely vaporized in said evaporator-condenser in the process of liquefying gaseous mixture passing towards the column, and means for withdrawing at a constant rate, predetermined at the capacity of the apparatus for the production of product of the desired purity, and raising the pressure of, the vaporized product including a booster pump and means for imposing a predetermined back pressure on said booster pump.

6. In an apparatus for producing substantially pure oxygen from air, in combination, a column, means for supplying to said column, at a predetermined rate and at a reduced temperature, dried and purified air, said supplying means including an evaporator-condenser having courses, in heat exchange relation with each other, for entering air and reversely flowing oxygen product, means for withdrawing said product in a liquid state from said column and raising its pressure to a point at which said product will just be completely vaporized in said evaporator-condenser in the process of liquefying air passing towards the column, and means for withdrawing at a constant rate predetermined at the capacity of the apparatus for the production of product of the desired purity, and raising the pressure of, the vaporized product including a booster pump and a predetermined back pressure maintaining valve for imposing a predetermined back pressure on said booster.

7. Method of producing substantially pure gaseous oxygen from compressed air which includes the delivery to a column of a predetermined quantity per unit of time of refrigerated air at an elevated pressure, passing a predetermined portion of such air through an evaporator-condenser en route to the column, effecting the rectification of the air in the column, withdrawing the oxygen as produced in the liquid state and increasing its pressure in such state so that, during normal operation of the column, said liquid oxygen will just be evaporated by heat exchange with the air flowing to the column through said evaporator-condenser, and withdrawing the evaporated liquid oxygen at a rate synchronized with the rate of air supply to maintain a constant back pressure in said evaporator-condenser so long as the liquid oxygen produced by the column is just evaporated by heat exchange with the air flowing to the column through the evaporator-condenser.

8. In an apparatus for separating oxygen from raw air and delivering it at a pressure substantially above atmospheric, a compressor for delivering raw air at a predetermined rate and pressure, means for freeing the entering air stream of moisture and carbon dioxide, means for effecting a division of the purified air stream, an expansion engine receiving and extracting heat from one of the divided portions of such air stream, a boiler-condenser for extracting heat from and normally completely condensing the other portion of such air stream, a column in which both of said portions are subjected to rectification into a liquid, mainly oxygen product and a mainly nitrogen effluent, a liquid oxygen pump for raising the pressure of said liquid oxygen product and effecting its delivery in a liquid state to said boiler-condenser at a pressure at which during normal operation complete vaporization thereof is effected by heat exchange with the purified air passing through and liquefied therein, a booster for the vaporized oxygen product, a constant back pressure valve in the booster discharge, and means for driving said compressor, liquid oxygen pump and booster at such rates that the liquid oxygen pump will just handle the normal production of oxygen product and said booster will just handle the normal volume of gaseous oxygen product, whereby, when an excessive quantity of oxygen product of reduced purity is produced, an increase in booster intake pressure will be caused, with increased liquid oxygen pressure in the boiler-condenser and reduced liquefaction of air in the latter.

9. The method of maintaining the delivery at a predetermined desired purity and a predetermined pressure of an oxygen product produced by the rectification of atmospheric air which includes the steps of delivering a predetermined quantity per unit of time of purified air at a predetermined pressure, in part through an expansion engine and in part through an evaporator-condenser, to a column, withdrawing oxygen product in its liquid state from the column and pumping it through the evaporator-condenser at an elevated pressure in heat exchange relation with the purified air passing through the latter towards the column, the quantity and pressure of the air flowing through the evaporator-condenser and the quantity and the pressure of the liquid oxygen flowing therethrough being such that the quantity of oxygen product produced under normal conditions will be completely vaporized in the evaporator-condenser in liquefying an equivalent quantity of purified air, raising the pressure of the gaseous oxygen product to a predetermined value, and utilizing pressure variations occurring at the suction side of the pressure raising means as variations in the quantity of oxygen product occur and are reflected back to said evaporator-condenser, to control the effectiveness of heat exchange in the evaporator-condenser.

10. The method of maintaining the delivery at a predetermined desired purity and a predetermined pressure of an oxygen product produced by the rectification of atmospheric air which includes the steps of delivering a predetermined quantity per unit of time of purified air at a predetermined pressure, in part through an expansion engine and in part through a boiler-condenser, to a column, withdrawing oxygen product in its liquid state from the column and pumping it through the evaporator-condenser at an elevated pressure in heat exchange relation with the purified air passing through the latter towards the column, the quantity and the pressure of air flowing through the evaporator-condenser and the quantity and the pressure of the liquid oxygen flowing therethrough being such that the quantity of oxygen product produced under normal conditions will be completely vaporized in the evaporator-condenser in liquefying an equivalent quantity of purified air, raising the pressure of the gaseous oxygen product to a predetermined value, and utilizing pressure increases at the suction side of the pressure raising means as increases in the quantity of oxygen product occur, to reduce the thermal efficiency of the evaporator-condenser and thereby diminish the output and increase the purity of the oxygen product.

11. In an apparatus for treating gaseous mixtures, in combination, a column, means, including a compressor for atmospheric air, for supplying to said column, at a predetermined rate and pressure and at a reduced temperature, dried and purified air, said supplying means including also an evaporator-condenser arranged for traverse in counterflow relation by a normally constant portion of the entering air and all of the oxygen product, means for withdrawing said product in a liquid state from said column and raising its pressure to a level at which all of the oxygen product will be vaporized in said evaporator-condenser and all of the air passing through said evaporator-condenser in counterflow relation to said oxygen product will be liquefied, and a booster pump for the vaporized oxygen product, operating in synchronism with said air supplying compressor and said liquid oxygen pump and of a capacity, when operating against a predetermined discharge pressure, to maintain constant the pressure of the vaporized oxygen product as it leaves said evaporator-condenser, and means for imposing on the discharge of said booster pump a constant back pressure.

12. In an apparatus for treating gaseous mixtures, in combination, a column, means, including a compressor for atmospheric air, for supplying to said column, at a predetermined rate and pressure and at a reduced temperature, dried and purified air, said supplying means including also reversing heat exchangers and an evaporator-condenser arranged, in series with said heat exchangers, for traverse by a normally constant portion of the entering air and having provision for traverse, in counterflow relation to said air, by all of the oxygen product, means for withdrawing said oxygen product in a liquid state from said column and raising its pressure to a level at which all of the oxygen product will be vaporized in said evaporator-condenser and all of the air passing through said evaporator-condenser in counterflow relation to said oxygen product will be liquefied, means for conducting the vaporized oxygen product to said reversing heat exchangers, and a booster pump for the vaporized oxygen product, operating in synchronism with said air supplying compressor and said liquid oxygen pump and of a capacity, when operating against a predetermined discharge pressure, to maintain constant the pressure of the vaporized oxygen product as it leaves said reversing heat exchangers, and means for imposing on the discharge of said booster pump a constant back pressure.

References Cited in the file of this patent

UNITED STATES PATENTS

| Number | Name | Date |
| --- | --- | --- |
| 2,480,094 | Anderson | Aug. 23, 1949 |
| 2,501,999 | Fausek | Mar. 28, 1950 |
| 2,503,939 | De Baufre | Apr. 11, 1950 |
| 2,541,409 | Cornelius | Feb. 13, 1951 |
| 2,632,302 | Steele | Mar. 24, 1953 |
| 2,640,332 | Keyes | June 2, 1953 |